United States Patent
El Aile

(10) Patent No.: US 10,081,387 B2
(45) Date of Patent: Sep. 25, 2018

(54) NON-AUTONOMOUS STEERING MODES

(71) Applicant: Ford Global Technologies, LLC, Dearborn, MI (US)

(72) Inventor: Steven R. El Aile, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/426,154

(22) Filed: Feb. 7, 2017

(65) Prior Publication Data

US 2018/0224847 A1 Aug. 9, 2018

(51) Int. Cl.
*B62D 6/00* (2006.01)
*B62D 15/02* (2006.01)
*G05D 1/02* (2006.01)
*B62D 5/04* (2006.01)

(52) U.S. Cl.
CPC ........... *B62D 6/007* (2013.01); *B62D 5/0457* (2013.01); *B62D 15/0245* (2013.01); *G05D 1/021* (2013.01)

(58) Field of Classification Search
CPC .. B62D 6/007; B62D 5/0457; B62D 15/0245; G05D 1/021
See application file for complete search history.

(56) References Cited

U.S. PATENT DOCUMENTS

| | | | | |
|---|---|---|---|---|
| 5,924,512 A | * | 7/1999 | Wada | B62D 7/026 180/253 |
| 5,996,722 A | * | 12/1999 | Price | B62D 7/1509 180/234 |
| 7,028,804 B2 | * | 4/2006 | Eki et al. | B62D 15/0245 180/446 |
| 7,625,287 B2 | | 12/2009 | Champagne et al. | |
| 7,681,322 B1 | | 3/2010 | Pruitt et al. | |
| 2009/0038186 A1 | * | 2/2009 | Osswald et al. | B62D 21/14 701/469 |
| 2010/0280716 A1 | * | 11/2010 | Shah et al. | B62D 6/007 701/42 |

(Continued)

FOREIGN PATENT DOCUMENTS

GB 2525036 A 10/2015
KR 100871044 B1 11/2008

(Continued)

OTHER PUBLICATIONS iSuper, "iSuper Ferrari Car Controlled with iPhone iPod iPad and Android Phones/Tablets," Nov. 22, 2016, amazon.com; 5 pages.

(Continued)

*Primary Examiner* — Dale W Hilgendorf
(74) *Attorney, Agent, or Firm* — Frank A. MacKenzie; Bejin Bieneman PLC

(57) ABSTRACT

A computer is programmed to detect a request to steer a host vehicle. The computer is further programmed to determine a steering angle of the host vehicle. The computer is further programmed to send a notification to select one of a first non-autonomous steering mode and a second non-autonomous steering mode. The computer is further programmed to detect a selection of one of the first and second non-autonomous steering modes. The computer is further programmed to steer the host vehicle according to the selected mode and signals received from a user device.

16 Claims, 3 Drawing Sheets

(56) References Cited

U.S. PATENT DOCUMENTS

| | | |
|---|---|---|
| 2012/0215380 A1 | 8/2012 | Fouillade et al. |
| 2014/0172197 A1 | 6/2014 | Ganz et al. |
| 2015/0083509 A1* | 3/2015 | Borroni-Bird et al. ..................... B62D 5/0418 180/204 |
| 2016/0129958 A1* | 5/2016 | Byrnes et al. ....... B62D 63/025 180/12 |
| 2017/0293306 A1 | 10/2017 | Riefe et al. |

FOREIGN PATENT DOCUMENTS

| | | |
|---|---|---|
| WO | 2014199877 A1 | 12/2014 |
| WO | WO 2015199600 A1 | 12/2015 |

OTHER PUBLICATIONS

Massey, Ray, "The remote control Range Rover: New 4 x 4 is fitted with Bond-style gadget for squeezing into tight parking spots," Mail Online; Jun. 15, 2015; 7 pages.

Search Report dated Jul. 24, 2018 from United Kingdom Intellectual Property Office regarding Application No. GB1801856.4 (5 pages).

* cited by examiner

NON-AUTONOMOUS STEERING MODES

BACKGROUND

Autonomous vehicles automate certain driving-related tasks. Fully autonomous vehicles can control all steering, braking, and throttle during a trip. Semi-autonomous vehicles can provide limited control over steering, braking, and throttle under certain circumstances.

Autonomous and semi-autonomous vehicles may, under certain circumstances, transfer some or all control of the vehicle back to a vehicle driver. The transfer of control may be referred to as a handoff procedure, or simply a "handoff."

DETAILED DESCRIPTION

Introduction

A computer 110 of a host vehicle 100 is programmed to detect a request from, e.g., a display device and/or a user device 135, to steer the host vehicle 100. The computer 110 is further programmed to determine a steering angle of the host vehicle 100. The computer 110 is further programmed to send a notification to, e.g. the display device and/or the user device 135, to select one of a first non-autonomous steering mode and a second non-autonomous steering mode. The computer 110 is further programmed to detect a selection of one of the first and second non-autonomous steering modes. The computer 110 is further programmed to steer the host vehicle 100 according to the selected mode and signals received from the user device 135.

Figure 1:
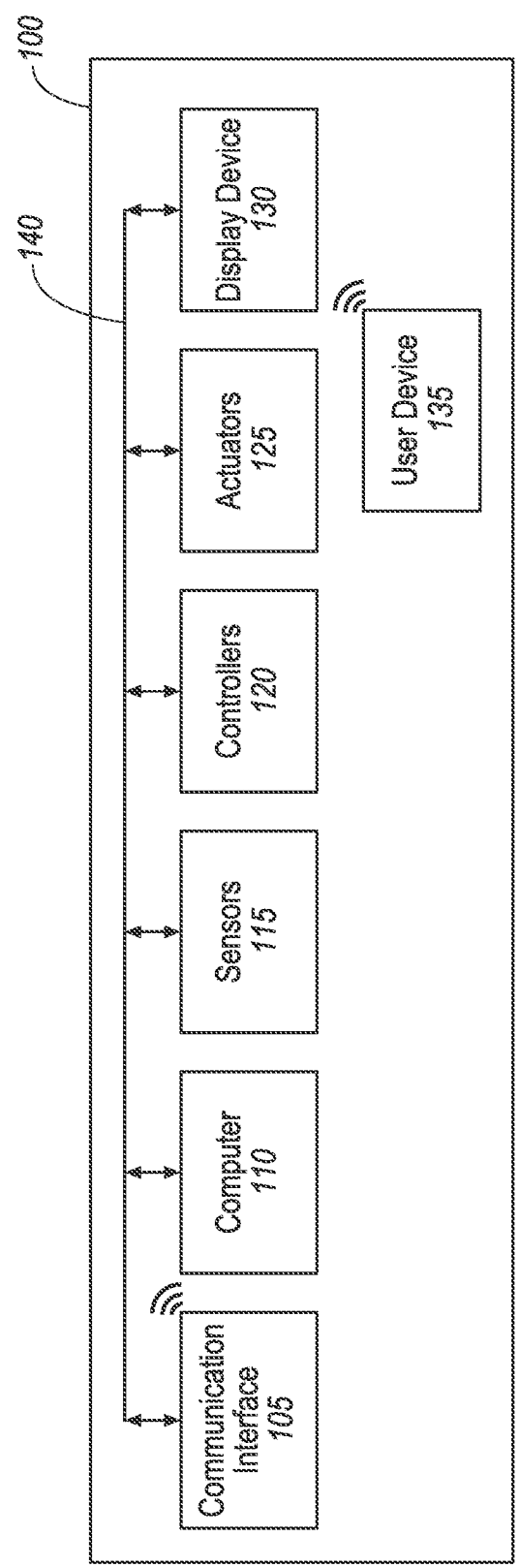
FIG. 1 is a block diagram of an example host vehicle including a computer.

FIG. 1 is a block diagram of the host vehicle 100. The host vehicle 100 can include a communication interface 105, the computer 110, sensors 115, controllers 120, actuators 125, and a display device 130, e.g., a human machine interface (HMI), in communication with each other over a vehicle communication network 140, each of which is discussed in more detail below.

As further shown in FIG. 1, the user device 135 can be located in the host vehicle 100. The user device 135 may be any of a variety of mobile computing devices that include a processor and a memory, a display, a touchscreen, an accelerometer, and communication capabilities.

Exemplary System Elements

The host vehicle 100 may be powered in variety of known ways, e.g., with an electric motor and/or internal combustion engine. The host vehicle 100 can include the communication interface 105, the computer 110, sensors 115, controllers 120, actuators 125, the display device 130, the vehicle communication network 140, and other vehicle components.

The communication interface 105 can include an antenna, circuits, chips, and/or other electronic components. For example, the communication interface 105 can include known electronic circuitry such as a wireless signal transmitter, a wireless signal receiver, and an amplifier circuit to boost an outgoing and an incoming wireless signal.

The communication interface 105 can be programmed to communicate with various electronic devices, such as the user device 135. The communication interface 105 can communicate with electronic devices (including the user device 135) via a wireless network, e.g., via Bluetooth®, Bluetooth® Low Energy, WIFI communication protocol, Near-Field Communication (NFC), etc. Additionally, or alternatively, the communication interface 105 can communicate with electronic devices (including the user device 135) via a wired network, e.g., via a Universal Serial Bus (USB), a controller area network (CAN), Ethernet, a Mobile High Definition Link (MHL), a High Definition Multimedia Interface (HDMI), a Local Interconnect Network (LIN), etc.

The communication interface 105 can be further programmed to communicate with components of the host vehicle 100. For example, the communication interface 105 can be programmed to communicate with the computer 110, sensors 115, controllers 120, actuators 125, and the display device 130. The communication interface 105 may be programmed to communicate with the vehicle components in accordance with any number of wireless communication protocols including, for example, Bluetooth®, Bluetooth® Low Energy, WIFI communication protocol, NFC, etc. Additionally, or alternatively, the communication interface 105 may be programmed to communicate with the vehicle components over the vehicle communication network 140 via a CAN, Ethernet, LIN, and/or other wired communication protocols.

Thus, the communication interface 105 can facilitate communications between the user device 135 and the vehicle components of the host vehicle 100, including the computer 110. For example, when the user device 135 is in communication with the communication interface 105, the communication interface 105 may output data to the computer 110 over the vehicle communication network 140, indicating, e.g., that the user device 135 and the communication interface 105 are connected, i.e., that the user device 135 and the communication interface 105 can transmit and receive communications (such as requests, notifications, selections, and other signals) to and from each other, among other things. In addition, the computer 110 (and the other vehicle components of the host vehicle 100) can communicate with the user device 135 via the communication interface 105. In this way, the computer 110 and the user device 135 can transmit and receive communications (e.g., requests, notifications, selections, and other signals) to and from each other.

The computer 110 includes a processor and a memory, as are known. The memory includes one or more forms of computer-readable media, and stores instructions executable by the computer 110 for performing various operations, including those disclosed herein.

The computer 110 can operate the host vehicle 100 in an autonomous or semi-autonomous mode. For purposes of this disclosure, an autonomous mode is one in which the computer 110 controls propulsion, braking, and steering of the host vehicle 100. In a semi-autonomous mode, the computer 110 controls one or two of the propulsion, braking, and steering of the host vehicle 100.

The computer 110 can include programming to operate one or more of the propulsion (e.g., control of acceleration in the vehicle by controlling one or more of an internal combustion engine, electric motor, hybrid engine, etc.), braking, and steering of the host vehicle 100. The computer 110 may be further programmed to operate climate control, interior and/or exterior lights, etc., as well as to determine whether and when the computer 110, as opposed to a human operator, is to control such operations.

As discussed above, the computer 110 is generally arranged for communications on the vehicle communication network 140. The computer 110 may include or be communicatively coupled, e.g., via the vehicle communications network 140, to more than one processor, e.g., to controllers 120 or the like included in the host vehicle 100 for monitoring and/or controlling various subsystems such as a powertrain, brake, steering, etc.

Via the vehicle communication network 140, the computer 110 may transmit data to and/or receive data from the vehicle components in the host vehicle 100, e.g., the communication interface 105, sensors 115, controllers 120, actuators 125, the display device 130, etc. Alternatively, or additionally, in cases where the computer 110 comprises multiple devices, the vehicle communication network 140 may be used for communications between devices represented as the computer 110 in this disclosure. Further, as mentioned below, sensors 115, controllers 120 and/or actuators 125 may provide to and receive signals from the computer 110 via the vehicle communication network 140.

As discussed above, generally included in instructions stored in the memory and executed by the computer 110 is programming for operating one or more vehicle components, e.g., braking, steering, propulsion, etc., without intervention of a human operator. Using data received by the computer 110, e.g., data from sensors 115, etc., the computer 110 may make various determinations and/or control various vehicle components and/or operations without a driver to operate the vehicle.

For example, the computer 110 may include programming to regulate vehicle operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a location, etc.

Sensors 115 can include a variety of devices known to provide data via the vehicle communication network 140, or other suitable interfaces such as are known. For example, the sensors 115 can include one or more cameras, radars, and/or Light Detection and Ranging (LIDAR) sensors disposed in and/or on the host vehicle 100 providing data encompassing at least some of the vehicle exterior. The data may be received by the computer 110 via, e.g., the vehicle communication network 140.

The sensors 115 include a steering angle sensor for detecting a steering angle of the host vehicle 100. The term "steering angle" as used herein refers to an angle between a longitudinal axis of a body of a host vehicle 100 and a steered road wheel of the host vehicle 100.

For example, when a steered road wheel is parallel to the longitudinal axis of the host vehicle 100, the steering angle is zero degrees (when measured in degrees). When the steered road wheel is turned 30-degrees left relative to a heading and the longitudinal axis of the host vehicle 100, the steering angle is 30 degrees. When the steered road wheel is turned thirty degrees right relative to the heading and the longitudinal axis of the host vehicle 100, the steering angle is −30 degrees, etc.

The steering angle sensor can be of any variety of known types. For example, the steering angle sensor can rotationally engage a steering wheel and/or a steering column to determine the steering angle. In another example, the steering angle sensor may include a mechanical coupling such as a bearing and an electronic component, e.g., an optical sensor, a resistive transducer, etc., to determine the steering angle. As discussed above, the steering angle sensor can provide data to the computer 110, such as the steering angle, via, e.g., the vehicle communication network 140.

Controllers 120, as that term is used herein, are processors that are generally programmed to control a specific vehicle subsystem. Examples include a powertrain controller, a brake controller, and a steering controller, etc. A controller may be an electronic control unit (ECU) as is known, possibly including additional programming as described herein. The controllers 120 may be communicatively connected to send and receive instructions from the computer 110 to actuate the subsystem according to the instructions. For example, a steering controller subsystem may receive instructions from the computer 110 via the vehicle communication network 140 to steer the host vehicle 100.

The actuators 125 include circuits, chips, or other electronic components that can actuate various vehicle subsystems in accordance with appropriate control signals as is known. For instance, the actuators 125 may include one or more relays, servomotors, etc. The actuators 125 may be used to control braking, acceleration, and steering of the host vehicle 100. The control signals used to control the actuators 125 may be generated by the computer 110, or a control unit located in the host vehicle 100, e.g., the steering controller, etc.

The display device 130, e.g., an HMI, can include a touchscreen, an interactive voice response (IVR) system, and/or other input/output mechanisms such as are known, and can receive input data from an occupant of the host vehicle 100 and/or output data to the occupant. The display device 130 may have, e.g., a soft key or a push button to send signals to the computer 110 in the various ways described above. For example, the signals may include notifications to the computer 110 to steer the host vehicle 100 via a user device 135. Additionally, or alternatively, the signals to the computer 110 can indicate that the user device 135 is at a desired zero-degree steering angle position.

The user device 135 is a portable computing device that, as discussed above, includes a memory, a processor, a display, a touchscreen, an accelerometer, and communication capabilities. In addition to the touchscreen and accelerometer, the user device 135 can include other input mechanisms, such as buttons, a microphone, a gyroscope, etc.

The user device 135 includes hardware and software for, e.g., wireless communications such as described above. In addition, the user device 135 may be programmed to send and receive communications via a wired network. Accordingly, the user device 135 may be any of a variety of computing devices, such as a smartphone, a tablet, a personal digital assistant, etc.

As discussed above, the user device 135 can communicate with vehicle components, including electronic components, such as the computer 110 of the host vehicle 100. For example, the user device 135 can send and receive signals (e.g., requests, notifications, selections, etc.) from and to the computer 110 via, e.g., the communication interface 105.

The user device 135 may transmit certain identifiers that are unique to each user device 135. The identifiers may include a MAC Address, an International Mobile Equipment Identifier (IMEI), an Electronic Serial Number (ESN), a Mobile Equipment Identifier (MEID), a Mobile Directory Number (MDN), a Mobile Identification Number (MIN), a Mobile Subscription Identification Number (MSIN), an International Mobile Subscriber Identification number (IMSI), a static or dynamic IP address, an email address, and the like.

The computer 110 may be programmed to associate one or more user devices 135 with occupants of the host vehicle 100. For example, identifiers associated with user devices 135 of past, present and future occupants of the host vehicle 100 can be stored in the memory of the computer 110. In this way, when a user device 135 having identifiers associated with an occupant communicates with, e.g., the computer 110 via, e.g., the communication interface 105, the computer 110 can be programmed to associate the user device 135, and the communications from that user devices 135, with that occupant. In addition, the computer 110 can be programmed to transmit communications to the user device 135 associated with that occupant.

As discussed above, user devices 135 include a display. The display can be a visual display that includes a touchscreen associated with, e.g., layered on top of, the visual display. In this way, a user can interact with the user device 135 by touching areas of the display. Thus, the display of a user device 135 may depict, e.g., a virtual steering wheel, and the user of the user device 135 may touch and move the virtual steering wheel relative to the user device 135. The user device 135 can include programming to communicate movement of the virtual steering wheel via the display to, e.g., the computer 110 via the communication interface 105. Accordingly, the user device 135 can steer the host vehicle 100 in a non-autonomous steering mode via the virtual steering wheel described above.

Additionally, the user device 135 can steer the host vehicle 100 in other non-autonomous steering modes, including via the accelerometer. For example, the accelerometer in the user device 135 can sense movement, rate of movement, gravity, as well as an angle at which the user device 135 is positioned. The user device 135 can include programming to communicate movement, the rate of movement, and the angle of the user device 135 that results from rotating the user device 135, tilting the user device 135, etc., to the computer 110 via the communication interface 105.

While FIG. 1 shows the user device 135 in the host vehicle 100, it should be understood that the user device 135 may be removed from the host vehicle 100 and remain in communication with, e.g., the computer 110 of the host vehicle 100 via, e.g., the communication interface 105. For example, the user device 135 and the communication interface 105 can communicate via the wireless network as discussed above when the user device 135 is removed from the host vehicle 100 to the extent of the wireless network's range.

Exemplary Process Flow

Figure 2A:
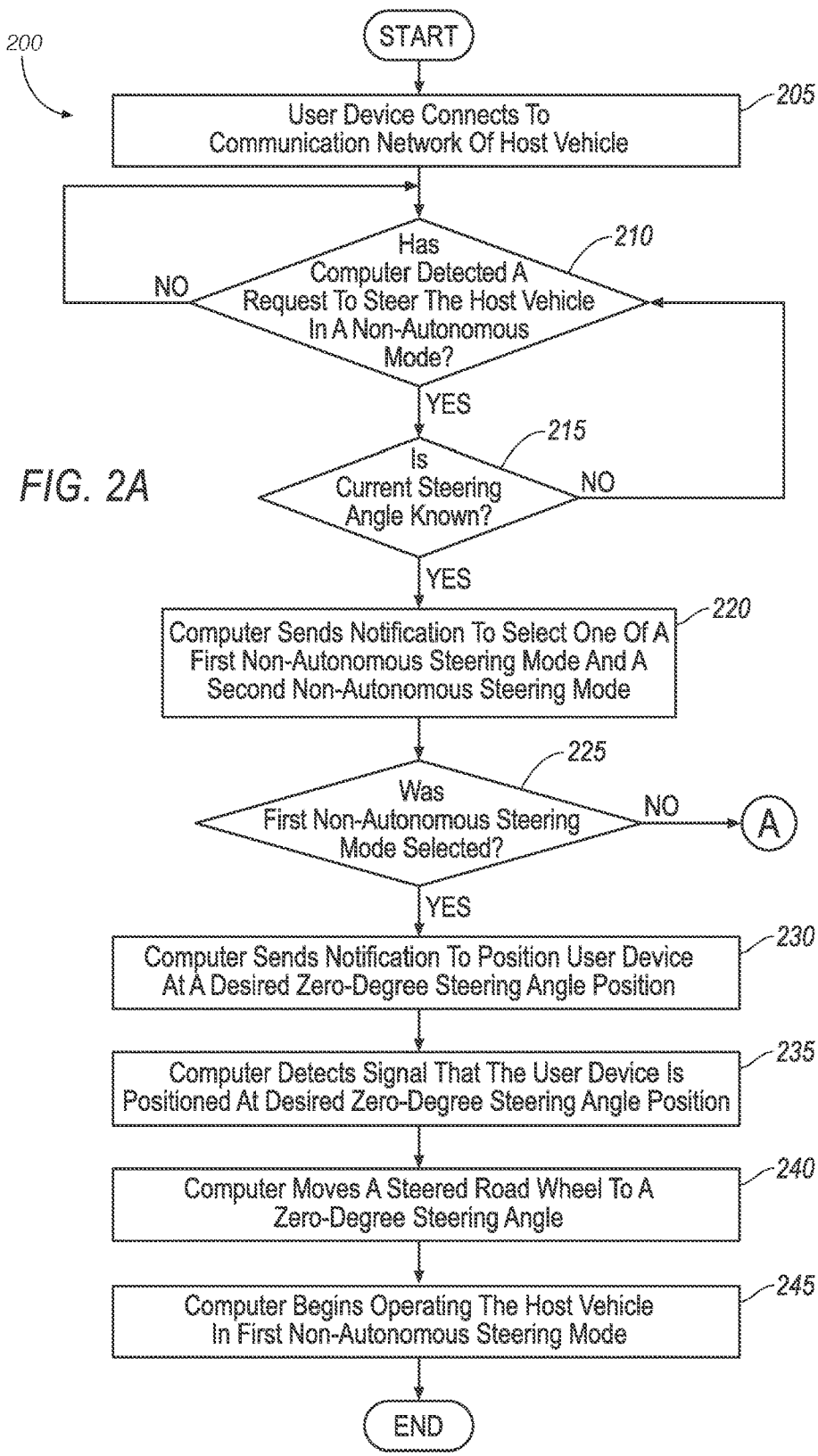
FIGS. 2A and 2B are, collectively, a flowchart of an example process for the computer.
Figure 2B:
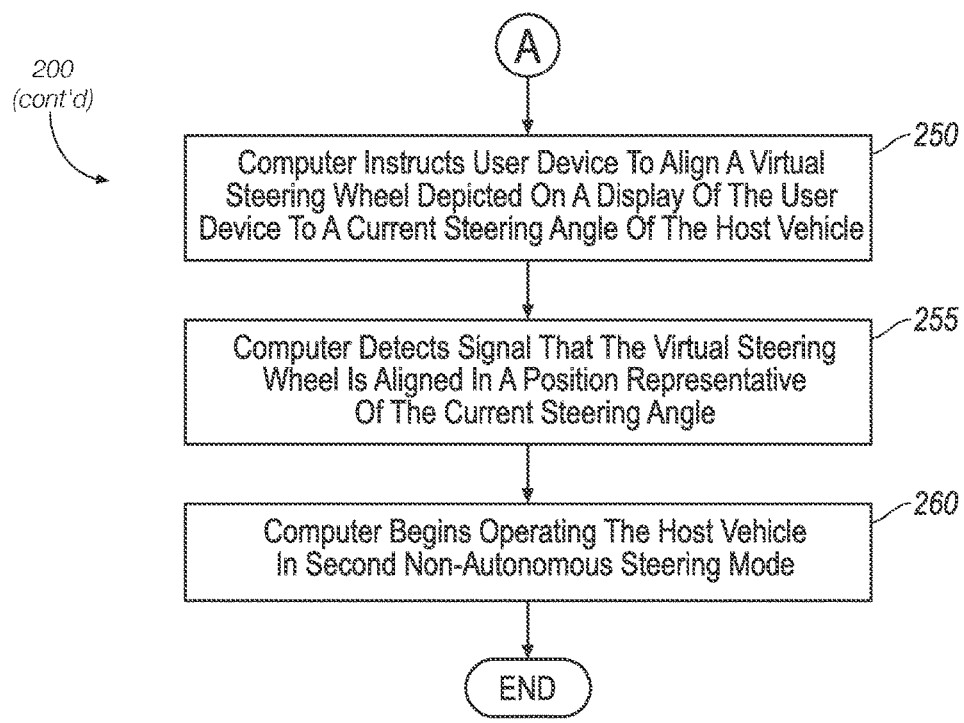

FIGS. 2A and 2B illustrate an example process 200 that may be executed by the computer 110 of the host vehicle 100. The process 200 may begin at any time the host vehicle 100 is running in the autonomous mode or in the semi-autonomous mode in which the computer 110 is controlling the steering without intervention from a human operator. The process 200 may continue to execute until, e.g., the host vehicle 100 is no longer running.

In a block 205, the user device 135 connects to the communication interface 105 of the host vehicle 100. In this way, the user device 135 and the communication interface 105 can transmit and receive communications (such as requests, notifications, selections, and other signals) to and from each other. As discussed above, the communication interface 105 can output a signal to the computer 110, e.g., over the vehicle communication network 140, indicating that the user device 135 is in communication with, i.e., connected to, the communication interface 105. From the block 205, the process 200 proceeds to a decision block 210.

In the decision block 210, the computer 110 of the host vehicle 100 is programmed to detect whether it has received a request to steer the host vehicle 100 in a non-autonomous mode. The request to steer the host vehicle 100 in a non-autonomous mode can originate from the user device 135, the display device 130, etc.

For example, as discussed above, the input mechanisms of the user device 135 can include a touchscreen, an accelerometer, buttons, a microphone, a gyroscope, etc. The input mechanisms of the user device 135 can originate the request to steer the host vehicle 100 in a non-autonomous mode. Additionally, or alternatively, the request to steer the host vehicle 100 in a non-autonomous mode can originate from an input mechanism of the display device 130. The input mechanisms of the display device 130 can include a touchscreen, an IVR system, a soft key a push button, etc.

If the computer 110 has detected a request to steer the host vehicle 100 in a non-autonomous mode, the process 200 proceeds to a decision block 215. If the computer has not detected a request to steer the host vehicle 100 in a non-autonomous mode, the process 200 remains at the decision block 210.

In the decision block 215, the computer 110 of the host vehicle 100 is programmed to detect the current steering angle of the host vehicle 100. As discussed above, the sensors 115 of the host vehicle 100 include a steering angle sensor. The steering angle sensor can detect the steering angle of the host vehicle 100, i.e., the angle between the longitudinal axis of the body of the host vehicle 100 and the steered road wheel of the host vehicle 100. Further, the steering angle sensor can provide data to the computer 110, such as the current steering angle, via, e.g., the vehicle communication network 140.

If the current steering angle is unavailable, the process 200 returns to the decision block 210, and the host vehicle 100 continues to operate in the autonomous mode, or in the semi-autonomous mode such that the computer 110 controls the steering of the host vehicle 100 without intervention from a human operator. If the current steering angle can be determined by the computer 110 via the steering angle sensor, the process 200 proceeds to a block 220.

In the block 220, the computer 110 of the host vehicle 100 is programmed to send a notification to select one of a first and a second non-autonomous driving mode. The computer 110 can be programmed to send the notification to, e.g., the user device 135, the display device 130, or both, via the communication interface 105. From the block 220, the process 200 proceeds to a decision block 225.

In the decision block 225, the computer 110 of the host vehicle 100 is programmed to detect whether a first non-autonomous steering mode is selected. The first non-autonomous steering mode can include, e.g., moving the user device 135, e.g., rotating and/or tilting the user device 135, to steer the host vehicle 100.

For example, as discussed above, the user device 135 includes an accelerometer. The accelerometer can sense movement, rate of movement, gravity, and an angle at which the user device 135 is being held. In addition, the user device 135 can be programmed to communicate movement and the rate of movement of the user device 135, e.g., from rotating and/or tilting the user device 135, to the computer 110 of the host vehicle 100 via, e.g., the communication interface 105.

In response to the communications from the user device 135, the computer 110 can instruct the controllers 120 to actuate a steering controller to steer the host vehicle 100 based on the movements of the user device 135. Alternatively, the computer 110 can be programmed to send control signals to actuators 125 to steer the host vehicle according to the movements of the user device 135.

The selection of the first non-autonomous steering mode can originate from, e.g., the user device 135, the display device 130, etc. From the decision block 225, if the computer 110 detects that the first non-autonomous steering mode has been selected, the process 200 proceeds to a block 230. If the first non-autonomous mode has not been selected, the process 200 proceeds to a block 250.

In the block 230, the computer 110 of the host vehicle 100 is programmed to send a notification to calibrate the user device 135 and the steering angle of the host vehicle 100, the notification including instruction to position the user device 135 at a desired zero-degree steering angle position. The computer 110 can be programmed to send the notification to, e.g., the user device 135, the display device 130, or both, via the communication interface 105. From the block 230, the process 200 proceeds to a block 235.

In the block 235, the computer 110 of the host vehicle 100 is programmed to detect a signal that the user device 135 is positioned at the desired zero-degree steering angle position. The signal can originate from the user device 135, the display device 130, etc. From the block 235, the process 200 proceeds to a block 240.

In the block 240, the computer 110 of the host vehicle 100 is programmed to move a steered road wheel of the host vehicle 100 to a zero-degree steering angle. As discussed above, the steered road wheel is at a zero-degree steering angle when the steered road wheel is parallel to the longitudinal axis of the host vehicle 100. For example, the computer 110 can send instruction to a steering controller via the vehicle communication network 140 to move the steered road wheel to the zero-degree steering angle. From the block 240, the process 200 proceeds to a block 245.

In the block 245, the computer 110 of the host vehicle 100 is programmed to begin operating the host vehicle 100 in the first non-autonomous steering mode. In the first non-autonomous steering mode, movement of the user device 135 steers the host vehicle 100.

As discussed above, the user device 135 can include programming to communicate signals representing movement, rate of movement and an angle of the user device 135 that results from moving the user device 135, e.g., rotating the user device 135, tilting the user device 135, etc., to the computer 110 via the communication interface 105. The computer 110 can be programmed to detect the signals from the user device 135, and steer the host vehicle 100 accordingly.

For example, if the user device is rotated left 30 degrees from the zero-degree steering angle position, the computer 110 can be programmed to move the steered road wheel of the host vehicle 100 to a 30-degree steering angle. If the user device is rotated right 30 degrees from the zero-degree steering angle position, the computer 110 can be programmed to move the steered road wheel of the host vehicle 100 to a −30-degree steering angle. The computer 110 can be further programmed to move the steered road wheel at the same rate as the movement of the user device 135. Following the block 245, the process 200 ends.

Referring back to the decision block 225, if the first non-autonomous steering mode is not selected in the decision block 225, the process 200 proceeds to the block 250.

In the block 250, the computer 110 of the host vehicle 100 is programmed to send a notification to calibrate the user device 135 and the steering angle of the host vehicle 100. In a second non-autonomous steering mode. The second non-autonomous steering mode can be, e.g., steering the host vehicle 100 via a virtual steering wheel depicted on a display of the user device 135. In that case, the computer is programmed to instruct the user device 135 to align the virtual steering wheel to a position representative of the current steering angle of the host vehicle 100.

As discussed above, the display of the user device 135 can be a visual display that includes a touchscreen associated with, e.g., layered on top of, the visual display. The user device 135 can be programmed to depict a virtual steering wheel on the display. In this way, a user may touch and move the virtual steering wheel depicted on the display relative to the user device 135. The user device 135 can include programming to align the virtual steering wheel according to instructions from the computer 110 of the host vehicle 100 via, e.g., the communication interface 105.

For example, if the current steering angle of the host vehicle 100 is −10 degrees, the computer 110 can be programmed to instruct the user device to align the virtual steering wheel in a position representative of a steering wheel turned to move a vehicle in a direction the vehicle would move when the current steering angle is −10 degrees, e.g. the steering wheel (and thus the virtual steering wheel) are rotated clockwise 45 degrees relative to a neutral position, i.e., a position where the steering wheel (and the virtual steering wheel) would be positioned when the current steering angle is 0 degrees.

From the block 250, the process 200 proceeds to a block 255.

In the block 255, the computer 110 of the host vehicle 100 is programmed to detect a signal indicating that the virtual steering wheel is aligned at the position representative of the current steering angle of the host vehicle 100. For example, the user device 135 may be programmed to generate the signal detected by the computer when the user device 135 completes alignment of the virtual steering wheel according to the instructions from the computer 110 provided in the block 250. From the block 255, the process 200 proceeds to a block 260.

In the block 260, the computer 110 is programmed to begin operating the host vehicle 100 in the second non-autonomous steering mode. In the second non-autonomous steering mode as described above, movement of the virtual steering wheel on the display of the user device 135 steers the host vehicle 100.

For example, the user device 135 can include programming to communicate signals representing movement of the virtual steering wheel, as well as a rate of movement the virtual steering wheel, to the computer 110 via the communication interface 105. The computer 110 can be programmed to detect the signals from the user device 135, and steer the host vehicle 100 accordingly. Following the block 260, the process 200 ends.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, VISUAL BASIC programming language, JAVA SCRIPT programming language, PERL programming language, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer comprising programming to:
   detect a request to steer a host vehicle in a non-autonomous mode;
   send a first notification upon determining that a current steering angle is unavailable;
   steer the host vehicle in one of an autonomous mode and semi-autonomous mode upon determining that the current steering angle is unavailable;
   determine the current steering angle of the host vehicle has become available; and
   as a result of determining that the current steering angle is available:
      send a second notification to select one of a first and second non-autonomous steering modes,
      detect a selection of one of the first and second non-autonomous steering modes, and
      steer the host vehicle according to the selected mode and signals received from a user device.

2. The computer of claim 1, wherein the computer is further programmed to:
   send a third notification upon determining the current steering angle, the third notification including instructions to calibrate the user device and a steering angle of the host vehicle according to the selected mode.

3. The computer of claim 2, wherein the selected mode includes moving the user device to steer the host vehicle.

4. The computer of claim 3, wherein the instructions to calibrate the user device and the steering angle of the host vehicle include instructions to position the user device at a desired zero-degree steering angle position.

5. The computer of claim 4, wherein the computer is further programmed to:
   detect a signal that the user device is positioned at the desired zero-angle steering angle position;
   move a steered road wheel of the host vehicle to a zero-degree steering angle; and
   begin operating in the selected mode upon determining that the steered road wheel is at the zero-degree steering angle.

6. The computer of claim 2, wherein the selected mode includes moving a virtual steering wheel on a display of the user device to steer the host vehicle.

7. The computer of claim 6, wherein the instructions to calibrate the user device and the steering angle include instructing the user device to align the virtual steering wheel at a position representative of the current steering angle.

8. The computer of claim 7, wherein the computer is further programmed to:
   detect a signal that the virtual steering wheel is aligned at the position representative of the current steering angle; and
   begin operating in the selected mode.

9. A method comprising:
   detecting a request to steer a host vehicle in a non-autonomous mode;
   sending a first notification upon determining that a current steering angle is unavailable;
   steering the host vehicle in one of an autonomous and semi-autonomous mode upon determining that the current steering angle is unavailable;
   determining the current steering angle of the host vehicle has become available; and
   as a result of determining that the current steering angle is available:
      sending a second notification to select one of a first and second non-autonomous steering modes,
      detecting a selection for one of the first and second non-autonomous steering modes, and
      steering the host vehicle according to the selected mode and signals received from a user device.

10. The method of claim 9, further comprising sending a third notification upon determining the current steering angle, the third notification including instructions to calibrate the user device and a steering angle of the host vehicle according to the selected mode.

11. The method of claim 10, wherein the selected mode includes moving the user device to steer the host vehicle.

12. The method of claim 11, wherein the instructions to calibrate the user device and the steering angle include instructions to position the user device at a desired zero-degree steering angle position.

13. The method of claim 12, further comprising:
   detecting a signal that the user device is positioned at the desired zero-angle steering angle position;
   moving a steered road wheel of the host vehicle to a zero-degree steering angle; and beginning to operate in the selected mode upon determining that the steered road wheel is at the zero-degree steering angle.

14. The method of claim 10, wherein the selected mode includes moving a virtual steering wheel on a screen of the user device to steer the host vehicle.

15. The method of claim 14, wherein the instructions to calibrate the user device and the steering angle include:
   instructing the user device to align the virtual steering wheel at a position representative of the current steering angle; and
   detecting a signal from the user device that the virtual steering wheel is aligned at the position representative of the current steering angle.

16. A computer comprising programming to:
   detect a request to steer a host vehicle in a non-autonomous mode;
   determine a current steering angle of the host vehicle;
   send a first notification upon determining the current steering angle, the first notification including instructions to calibrate a user device and a steering angle of the host vehicle according to the selected mode;
   send a second notification to select one of a first and second non-autonomous steering modes;
   detect a selection of one of the first and second non-autonomous steering modes; and
   steer the host vehicle according to the selected mode and signals received from the user device.

\* \* \* \* \*